United States Patent [19]
Dickey et al.

[11] Patent Number: 5,603,555
[45] Date of Patent: Feb. 18, 1997

[54] WHEEL AXLE-BEARING ASSEMBLY

[75] Inventors: Gary D. Dickey, Flower Mound; Michael W. Freitas, North Richland Hills, both of Tex.

[73] Assignee: Gismo's Inc., Flower Mound, Tex.

[21] Appl. No.: 539,822

[22] Filed: Oct. 6, 1995

[51] Int. Cl.$^6$ .................................................. B60B 27/00
[52] U.S. Cl. .......................... 301/111; 301/112; 301/64.7
[58] Field of Search ..................................... 301/111, 112, 301/118, 119, 121, 122, 105.1, 120, 131, 125

[56] References Cited

U.S. PATENT DOCUMENTS

| | | | |
|---|---|---|---|
| 2,940,781 | 6/1960 | Erickson | 301/111 |
| 3,870,371 | 3/1975 | Solomon | 301/1 |
| 3,909,066 | 9/1975 | Snowden | 301/111 |
| 4,955,669 | 9/1990 | Jankevics | 301/1 |
| 4,963,115 | 10/1990 | Davin et al. | 301/111 |
| 5,174,633 | 12/1992 | Kidd et al. | 301/64.7 |
| 5,222,786 | 6/1993 | Sovis et al. | 301/111 |
| 5,224,961 | 7/1993 | Liu | 301/111 |
| 5,277,480 | 1/1994 | Chiu | 301/111 |
| 5,408,854 | 4/1995 | Chiu | 301/111 |

*Primary Examiner*—David M. Mitchell
*Assistant Examiner*—Hoa B. Trinh
*Attorney, Agent, or Firm*—Smith & Catlett, P.C.

[57] ABSTRACT

A non-corrosive, small particle resistant wheel axle-bearing assembly for a free wheeling hand carry device is provided which includes a wheel, an axle spindle and an annular bearing. In a preferred embodiment of the invention, the wheel includes a central bore, an inwardly facing-surface, and an outwardly facing surface. The inwardly facing surface includes a centrally disposed retainer between the wheel and the body of the device. The outwardly facing surface includes a cylindrical recess for receiving a thrust flange. The axle spindle is integral with the body of the free wheeling device and includes a plurality of longitudinal channels which terminate in slots on the device's body. The annular bearing has a flange at its outer end, a plurality of locking projections at its inner end, and an inner cylindrical wall defining a central bore and an outer bearing surface. In a preferred embodiment of the invention, the bearing includes a plurality of locking ribs which run the longitudinal length of the inner cylindrical wall between the two ends, extending beyond the inner end to form the plurality of locking projections. When assembled, the wheel, axle spindle and bearing share the same axial centerline. The locking ribs of the bearing nonrotatably engage the locking channels of the axle spindle, which is centrally disposed within the wheel bore, thereby providing a nonslipping, particle resistant bearing surface.

18 Claims, 4 Drawing Sheets

WHEEL AXLE-BEARING ASSEMBLY

BACKGROUND OF THE INVENTION

1. Technical Field of the Invention

This invention relates to wheel axle-bearing assemblies, and more particularly, to an interlocking annular axle and bearing combination for use in wheel assemblies mounted on free wheeling devices such as wagons, wheelbarrows and other outdoor pull type carriers designed to transport small loads by hand.

2. Description of Related Art

The use of annular bearings in wheel assemblies is well known in the art. Wheel assemblies made with such bearings typically comprise a wheel with a central bore, an axle extending through the wheel bore and an annular bearing rotatably mounted therebetween. Wheel assemblies are disclosed, for example, in U.S. Pat. Nos. 5,174,633; 5,222,786; and 5,277,480. U.S. Pat. No. 5,174,633 to Kidd et al relates to a support bearing for a wheel. Kidd '633 discloses a wheel assembly comprising a wheel with a central bore, a spindle having a reduced central diameter and two annular bearing members. Each bearing member has a flange at one end and at least one locking member at the opposite end. When assembled, the bearing members are disposed within the central wheel bore and lockingly engaged over the opposing ends of the spindle at the shoulder formed by the reduced central diameter.

U.S. Pat. No. 5,222,786 to Sovis et al relates to a wheel assembly for a vacuum cleaner. As disclosed in Sovis '786, the wheel assembly includes a cylindrical axle, a collar, a wheel, and a cap. One end of the axle is mounted on the cleaner housing and the other end has a plurality of locking projections for engagement in a plurality of collar gaps. In this configuration, the wheel is fitted over the collar and axle such that the locking projections snap radially outward against the outer surface of the wheel.

U.S. Pat. No. 5,277,480 to Chui discloses a wheel assembly for use on a baby carriage. Chui includes a wheel, bearing sleeve, and pressing plates. The annual bearing comprises a cylindrical length with a flange at one end and a plurality of hooks at the other end. In this configuration, the sleeve member is secured against the axle with two pressing plates at the flange end and engagement of the locking hooks through the wheel bore at the opposite end.

Notwithstanding the wheel assemblies previously disclosed, there remains a need for an inexpensive, non-corrosive, small particle resistant annular axle-bearing assembly that is easy to manufacture and simple to maintain. Review of each of the foregoing references reveals no disclosure or suggestion of an apparatus such as that described and claimed herein. It would be a distinct advantage to have a wheel axle-bearing assembly which has a decreased likelihood of slippage between the axle and bearing member, allowing free rotation of the wheel over the bearing sleeve, and hence, increased reliability of movement over multiple surfaces. In addition, a wheel axle-bearing combination which is simpler than the prior art would have a distinct economic advantage as it would be easier to assemble, and less expensive to manufacture and sell.

SUMMARY OF THE INVENTION

A wheel assembly is provided including a wheel with an annular bearing in interlocking engagement with an axle spindle integral with the body of the free wheeling device. An object of the invention is to provide a non-corrosive, small particle resistant wheel axle-bearing assembly having reliable free wheeling capabilities over multiple surfaces and outdoor terrains. Constructed of materials such as plastic resins or polymers, another object of the invention is to provide an economical and easy to manufacture wheel axle-bearing assembly of substantial strength and durability.

In one aspect of the present invention, the outer surface of the axle and the inner surface of the bearing sleeve include a longitudinal interlocking channel and rib which prevents rotation or slippage between the axle and bearing. In another aspect of the present invention, the outer surface of the axle and the inner surface of the bearing include a plurality of interlocking channels and ribs. In another aspect of the present invention, the annular bearing has an inward end and an outward end. The inward end includes a plurality of resilient locking projections for locking engagement within a plurality of corresponding slots in the body of the free wheeling device. The outward end of the bearing includes a flange which provides a thrust surface.

In another aspect of the present invention, the thrust flange provides a barrier to small particle contamination of the wheel axle-bearing assembly. In yet another aspect of the present invention, the bearing flange includes a central screw for additional strength and thrust.

In still another aspect of the present invention, the wheel has an exterior surface including a surface inwardly facing the body of the free wheeling device and an outwardly facing surface on the opposite side of the wheel. The outwardly facing exterior surface includes a counterbore for receiving the bearing flange. In another aspect of the present invention, the inwardly facing exterior surface includes an angled spacer for decreasing frictional drag between the wheel and the body of the free wheeling apparatus. In addition, the angled spacer on the wheel provides increased stability and support to the free-wheeling apparatus.

In another aspect of the present invention, the wheel axle-bearing assembly is constructed of a plastic resin. In still another aspect of the present invention, the wheel axle-bearing assembly is constructed of a polymer material. In another aspect of the present invention, the polymer is polypropylene. In yet another aspect, the polymer is a high density polyethylene (HDPE) material. In still another aspect of the present invention, the preferred HDPE comprises a 12 melt index. In yet another aspect of the present invention, the wheels are constructed of an HDPE material having a fractional melt index. In still another aspect of the present invention, the HDPE material is UV stable.

In another aspect of the present invention, the bearing sleeve and wheel bearing surfaces are constructed of different materials for wear and friction reduction. In yet another aspect, wheel assembly is constructed of the compound acetal.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The wheel axle-bearing assembly of the present invention preferably comprises a wheel having an interlocking axle and bearing combination, resistant to small particle contamination, which does not disengage or slip during usage. When mounted on a free wheeling apparatus such as a wagon or hand-maneuvered tote, the apparatus can be more reliably moved across multiple-terrains without fear of bearing contamination or slippage on rough surfaces. Constructed of materials such as plastic resins or polymers, the wheel axle-bearing assembly is resistant to corrosion, and easy to manufacture and assemble.

Figure 1:
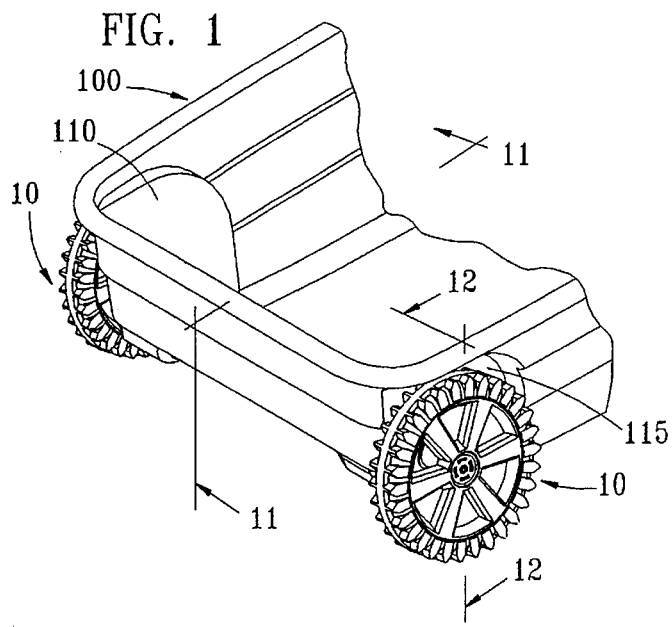
FIG. 1 is a perspective view of the rear portion of a free wheeling device utilizing two wheel axle-bearing assemblies in accordance with the teachings of the present invention.
Figure 11:
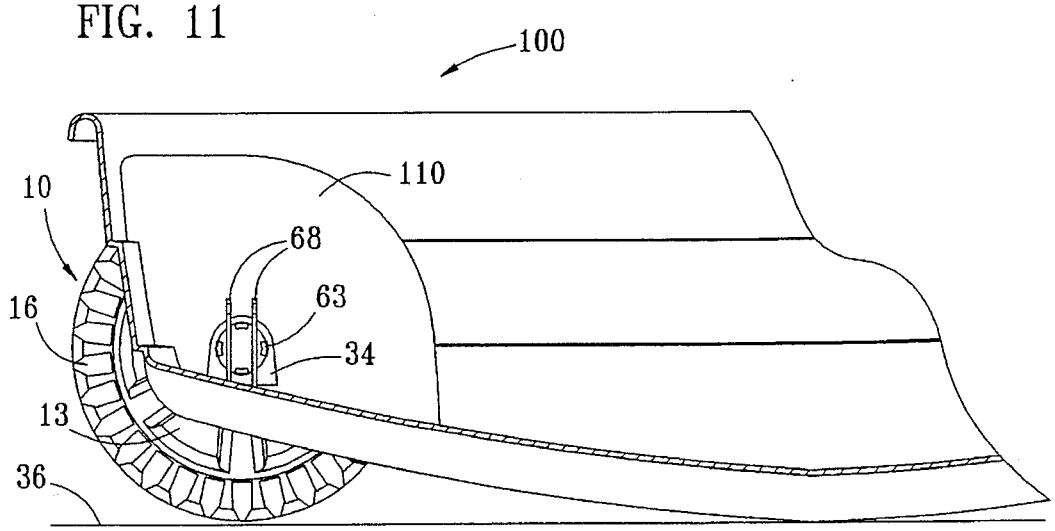
FIG. 11 is a cross-sectional side elevation view of the interior of the rear portion of a free wheeling apparatus taken along line 11—11 of FIG. 1 in accordance with the teachings of the present invention.

Referring to FIGS. 1 and 11, the rear wheel portion of a free wheeling apparatus 100 such as a wagon or tote is shown incorporating two wheel axle-bearing assemblies 10 in accordance with a preferred embodiment of the present invention. Such device includes a wheel well area 110 having a recessed wheel mounting surface 115. It will be understood and appreciated by those skilled in the art that the overall configuration of the wheel well area is not pertinent to the practice of the invention and is provided by way of example and illustration only.

Figure 2:
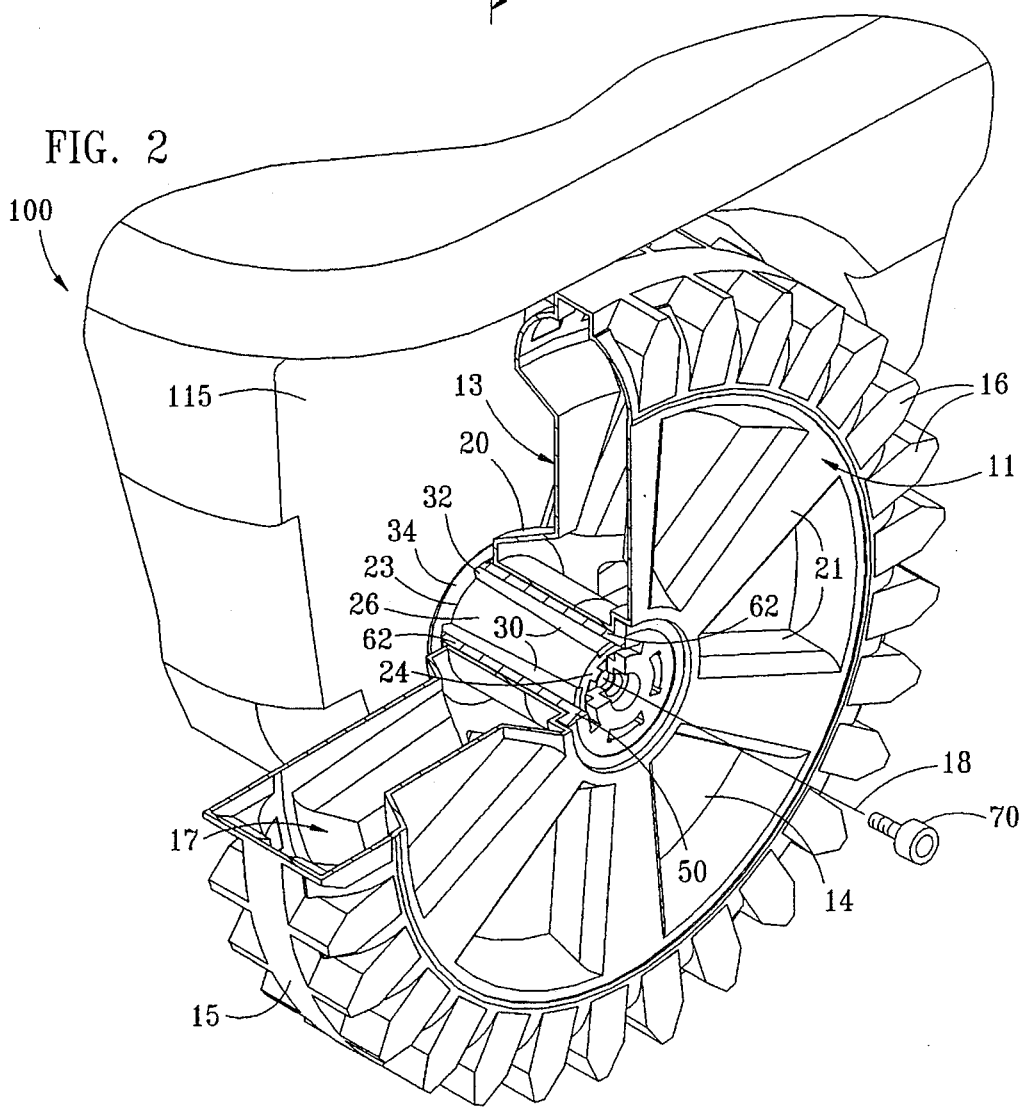
FIG. 2 is a detailed perspective view of a preferred embodiment of the invention shown partially in section.
Figure 3:
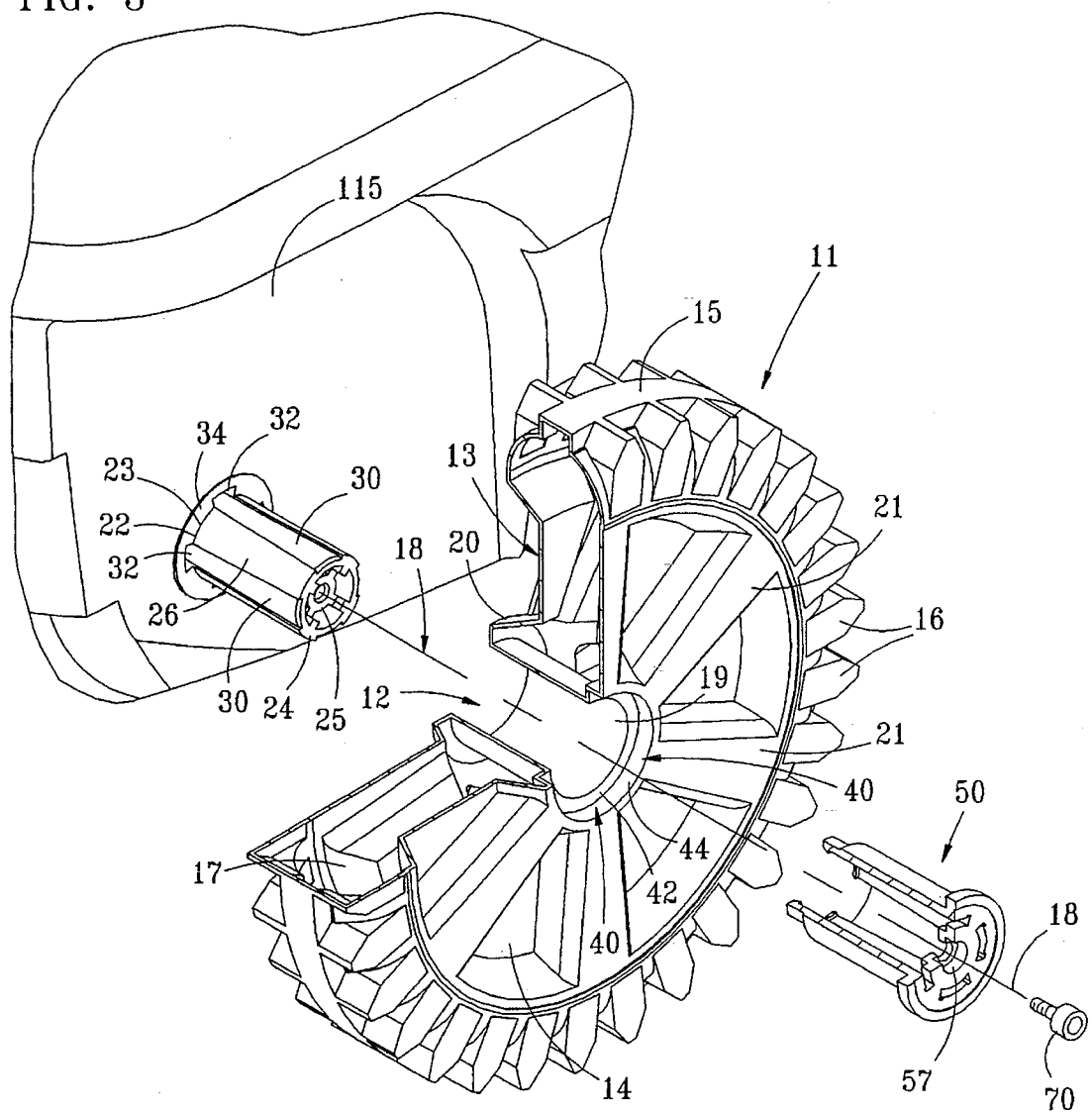
FIG. 3 is an exploded perspective view of a preferred embodiment of the invention shown partially in section.
Figure 4:
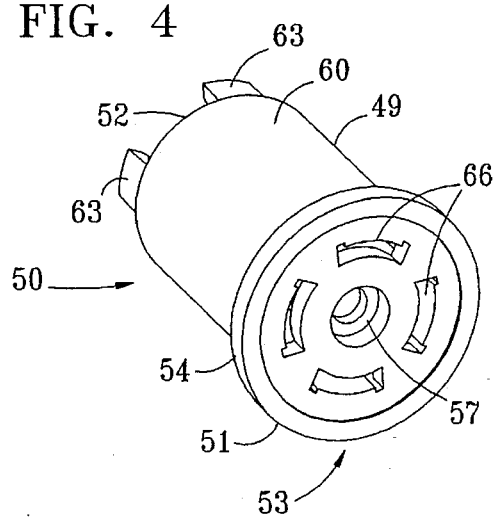
FIG. 4 is a perspective view of the outward facing flange end of the bearing of the present invention.
Figure 5:
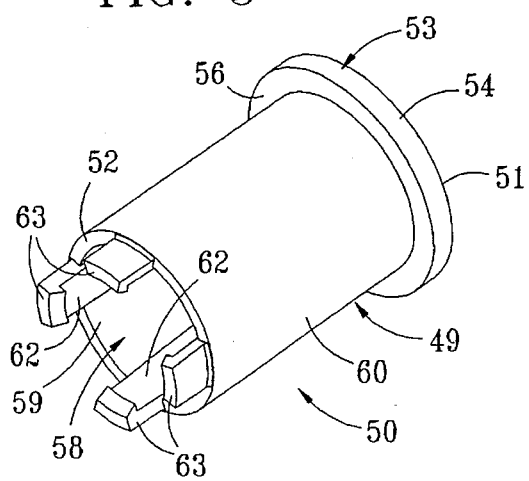
FIG. 5 is a perspective view of the inward facing locking end of the bearing of the present invention.
Figure 6:
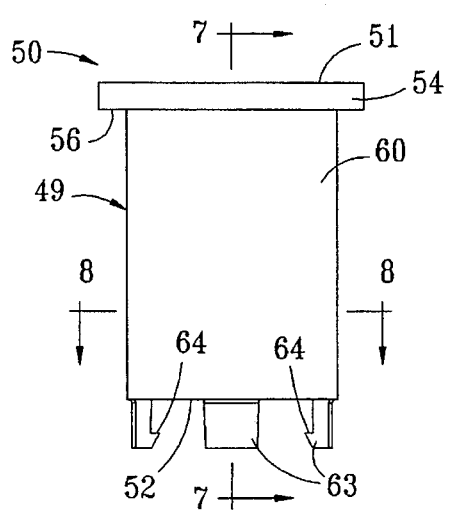
FIG. 6 is a side elevation view of the bearing of the present invention.
Figure 7:
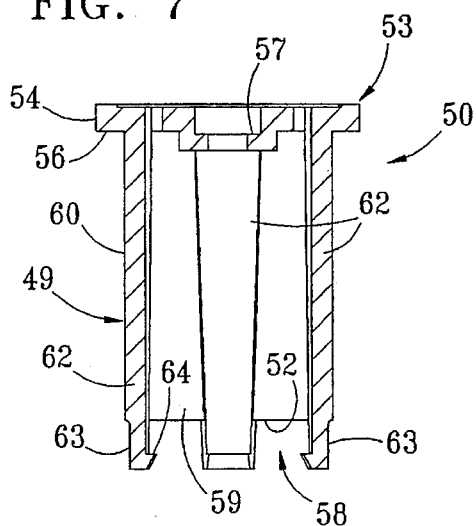
FIG. 7 is a longitudinal cross-sectional view of the bearing of the present invention taken along line 7—7 of FIG. 6.
Figure 8:
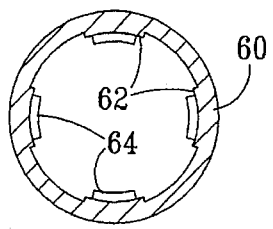
FIG. 8 is a lateral cross-sectional view of the bearing of the present invention taken along line 8—8 of FIG. 6.
Figure 9:
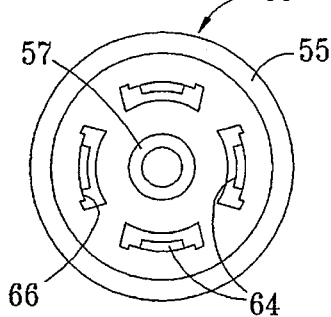
FIG. 9 is a plan view of the flange end of the bearing of the present invention.
Figure 10:
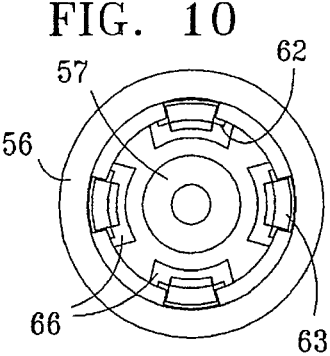
FIG. 10 is a plan view of the locking end of the bearing of the present invention.
Figure 12:
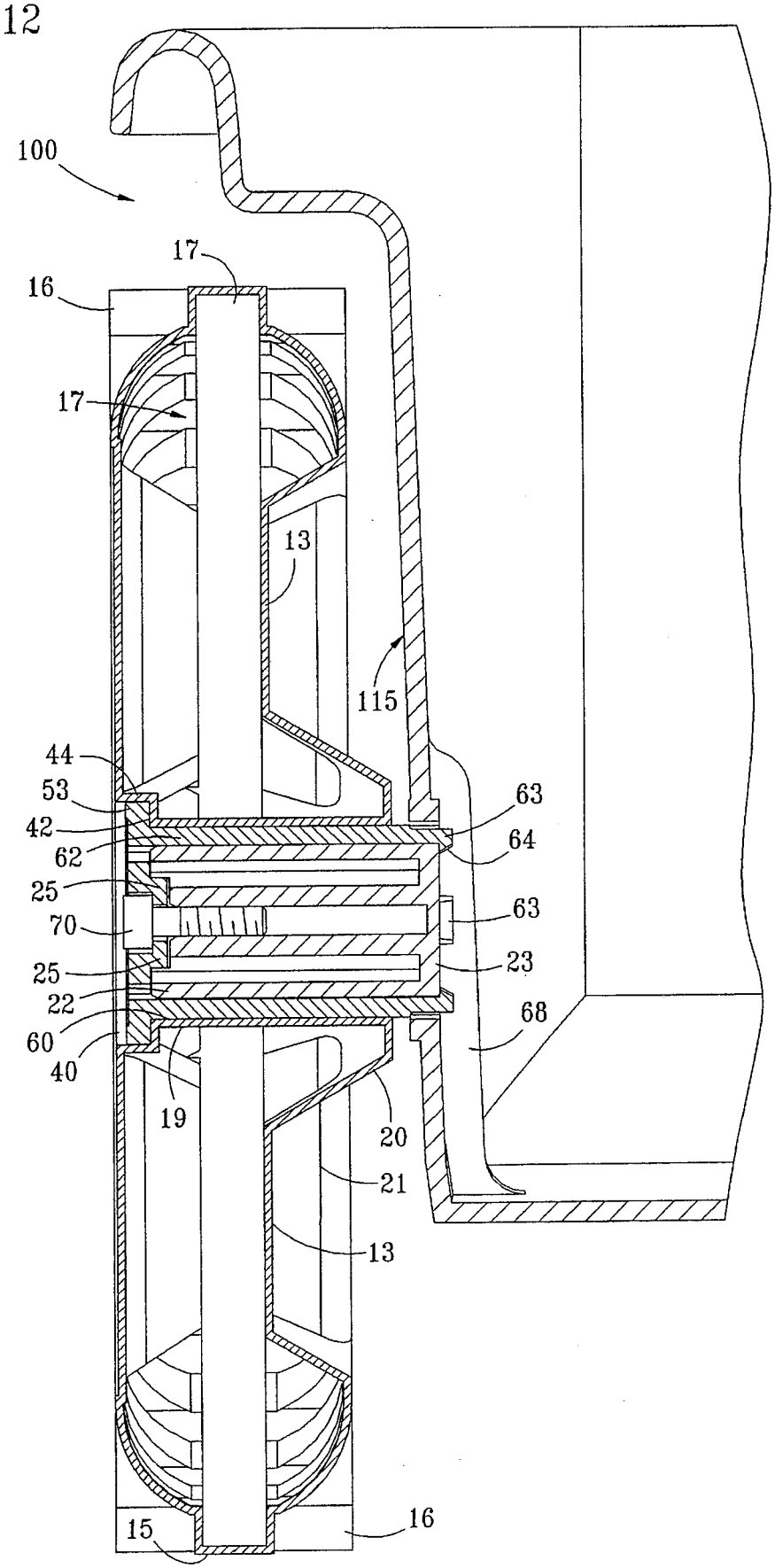
FIG. 12 is a cross-sectional side elevation view of the wheel axle-bearing assembly mounted on a free-wheeling apparatus taken along line 12—12 of FIG. 1 in accordance with the teachings of the present invention.

Referring to FIGS. 2 and 3, wheel assembly 10 preferably includes wheel 11, axle spindle 22 and annular bearing 50. As shown in FIGS. 1, 2, and 12, wheel 11 of wheel assembly 10 comprises an inward facing surface 13, an outward facing surface 14, and a circumferential surface 15 including treads 16 defining optionally hollow interior 17.

As shown in FIG. 3, surfaces 13, 14, and 15 are centrally disposed around an axial centerline 18 of wheel assembly 10, defining a central wheel bore 12. Central bore 12 preferably includes a smooth inner cylindrical wheel bearing surface 19 radially positioned around the axial centerline 18. The outwardly facing surface 14 of wheel 11 preferably includes a counterbore 40 having a smooth ledge 42 and inner cylindrical flange bearing surface 44 radially positioned around axial centerline 18 at a radius greater than wheel bearing surface 19. Inwardly facing surface 13 of wheel 11 further comprises an angled spacer 20 radially positioned around axial centerline 18. Surfaces 13, 14 of wheel 11 optionally include a plurality of spokes or ribs 21 radially extending from the bearing surface 19 for additional support and durability.

Referring to FIGS. 2, 3, and 12, axle spindle 22 having an axial centerline 18 preferably comprises a cylindrical outer surface 26, outward end 24, and inward end 23. In a preferred embodiment of the invention, axle 22 is integral with surface 115 of apparatus 100 such that axle 22 does not shift, move or rotate with respect to surface 115. It will be understood and appreciated by those skilled in the art that techniques to fixably attach axle 22 on surface 115 are dependant upon the materials used to construct both the free wheeling apparatus 100 and wheel axle-bearing assembly 10.

In a preferred embodiment of the invention, where both the apparatus 100 and wheel assembly 10 are constructed of a synthetic resin or hard plastic, the axle 22 and mounting surface 115 may be unitarily molded, blown or cut from a single die. For additional strength, axle 22 may include raised reinforcement skirt 34 radially extending from inward end 23, integrally formed within surface 115 and parallel reinforcement gussets 68. As shown in FIG. 3, axle 22 further comprises a plurality of channels 30 in outer surface 26 longitudinally extending between outward end 24 and inward end 23. Arcuate slots 32 in surface 115 are circumferentially spaced around integral inward end 23 at the base of each channel 30.

Referring to FIGS. 4–10, annular bearing 50 having an axial centerline 18 preferably includes cylindrical bearing sleeve 49, outward bearing end 51 and inward bearing end 52. Bearing sleeve 49 includes smooth bearing surface 60 and inner sleeve surface 59. Inner sleeve surface 59 comprises a plurality of ribs 62 longitudinally extending the length of sleeve 49 from the outward end 51 to the inward end 52. Ribs 62 terminate at inward end 52 forming locking projections 63 having lateral faced edge 64 for engaging in slots 32. Bearing 50 further comprises thrust flange 53 at outward end 51. Flange 53 includes outer circumference 54, outer facing surface 55, and inner rim 56. When assembled, thrust flange 53 rotatably rests in annular recess 40 of wheel 11 such that inner rim 56 rotates against surface 42 and flange circumference surface 54 rotates against flange bearing surface 44.

As depicted in the figures of the drawings, flange 53 further comprises arcuate slots 66. These slots are optionally present for ease in manufacturing locking ribs 62 and locking projections 63 in bearing 50. It will be understood and appreciated by those skilled in the art that alternative means of manufacturing parts may be available which would not require the use of slots in flange 53.

As shown in FIGS. 2, 3, and 12, wheel assembly 10 optionally includes a screw 70 for additional thrust. In the preferred embodiment, the bearing flange 53 and axle spindle 22 include a recess 57 and retaining means 25 at outward end 24 for receiving and securing screw 70. The retaining means 25 may be unitarily molded with the axle 22 at outward end 24 and is preferably threaded to receive the thrust screw 70.

In a preferred embodiment of the invention, wheel assemblies 10 and free wheeling device 100 are manufactured of non-corrosive materials. Suitable materials include a moldable resin or polymer such as DELRIN™, an acetal compound available from DuPont. In order to decrease bearing friction and increase durability, the inner bearing surface of the wheel and the outer bearing surface of the annular bearing should be constructed of different materials. In a preferred embodiment of the invention, wheel 11 is constructed of a UV stable, high density polyethylene (HDPE) having a fractional melt index, whereas axle 22 and bearing 50 are constructed of an HDPE having a 12 melt index. It will be understood and appreciated however, that various other materials of construction can be utilized. Regardless of the number of interlocking channels and ribs chosen, best results are achieved when locking projections 63 are constructed of a resilient material which yields during assembly and disassembly.

As shown in FIGS. 2, 3, and 12, wheel 11, axle spindle 22, and bearing 50 are assembled along axial centerline 18 such that locking ribs 62 of inner sleeve 59 slidably engage and interlock with channels 30 of spindle 22 and bearing surface 60 of bearing 50 is rotatably encircled by wheel bore 12. Lateral shoulders 64 of locking projections 63 engage in circumferential retaining slots 32 such that inward ends 23, 52 are locked into position near wheel face 13 and outward ends 24, 51 are locked near wheel face 14.

The cooperative alignment of interlocking channels 30, ribs 62, locking projections 63 and retaining slots 32 reliably prevent rotation of bearing sleeve 60 relative to the axle spindle 22. In this preferred configuration, showing four interlocking channels 30, ribs 62 and locking projections 63, rotation will only occur between wheel bearing surface 19, bearing sleeve surface 60, recess surfaces 42, 44, and flange surfaces 54, 56. In addition, placement of flange 53 against end 24 of axle 22 will decrease the amount of small particles able to enter any space between cooperating bearing surfaces 19, 60. In an alternate embodiment of the present invention, wheel axle-bearing assembly 10 may include only one channel 30 and slot 32 for interlocking engagement with one rib 62 and locking projection 63.

It is thus believed that the operation and construction of the present invention will be apparent from the foregoing description. While the apparatus shown and described has been characterized as being preferred, it will be readily apparent that various changes and modifications could be made therein without departing from the spirit and scope of the invention as defined in the following claims.

What is claimed is:

1. A wheel assembly for a free-wheeling device, comprising:

an axial centerline;

a wheel having an outward facing surface, an inward facing surface, and a central bore extending axially through said outward and inward facing surfaces defining an inner cylindrical bearing surface; wherein said outward surface has a recessed annulus radially disposed around said axial centerline and central bore;

an axle having a cylindrical outer surface, an outward end and an inward end, said inward end attached to said free-wheeling device; wherein said cylindrical outer surface has a channel extending axially along the length of the cylindrical surface, terminating at a slot in the free-wheeling device circumferentially disposed around said inward end; and an annular bearing having a central bore extending axially therethrough, defining an inner cylindrical surface and an outer bearing surface and having an outward end with a flange and an inward end with a locking projection, wherein said inner cylindrical surface of said annular bearing has a rib raised radially inward toward said axial centerline and extending longitudinally along the length of said central bore between said flange and said locking projection;

wherein said annual bearing is inserted within said cylindrical bore of said wheel and over said axle spindle such that said locking rib slidably engages within said locking channel along the longitudinal axial length of said spindle and bearing such that said bearing flange rotatably rests within said wheel flange recess and said locking projection fixably engages said circumferentially spaced retaining slot.

2. The wheel assembly of claim 1, further comprising a plurality of interlocking axle channels, bearing ribs, locking projections and circumferentially disposed slots.

3. The wheel assembly of claim 1, further comprising a spacer on said inward facing surface of said wheel circumferentially disposed around said central bore and axial centerline of said wheel.

4. The wheel assembly of claim 1, wherein said recessed annulus is a flange annulus.

5. The wheel assembly of claim 4, wherein said flange annulus comprises a ledge which extends radially inward toward said axial centerline and said central bore of said wheel, and a flange bearing surface which is perpendicular to said ledge.

6. The wheel assembly of claim 5, wherein said flange bearing surface has a circumference greater than the circumference of said inner cylindrical bearing surface of said wheel.

7. The wheel assembly of claim 1, wherein said inward end of said axle is fixably mounted on said free-wheeling device.

8. The wheel assembly of claim 7, wherein said inward end of said axle is unitarily molded with said free-wheeling device.

9. The wheel assembly of claim 1, wherein said outward end of said axle and said flange of said bearing further comprise a screw receiving means centrally disposed along said axial centerline.

10. The wheel assembly of claim 9, further comprising a screw inserted in said screw receiving means.

11. The wheel assembly of claim 1, wherein said axle comprises four channels, said free-wheeling device comprises four retaining slots, and said bearing comprises four ribs for interlocking engagement with said four channels, and four locking projections for interlocking engagement with said four retaining slots.

12. The wheel assembly of claim 1, wherein said locking projections are constructed of a resilient material which yields during assembly until said locking projections snap into said retaining slots.

13. The wheel assembly of claim 1, wherein said wheel, axle and bearing are constructed of a plastic resin.

14. The wheel assembly of claim 1, wherein said wheel, axle and bearing are constructed of a molded plastic.

15. The wheel assembly of claim 1, wherein said wheel, axle and bearing are constructed of a polymer.

16. The wheel assembly of claim 1, wherein said inner cylindrical bearing surface of said wheel and said outer bearing surface of said bearing are constructed of two different materials.

17. The wheel assembly of claim 15, wherein said polymer is a high density polyethylene ("HDPE").

18. The wheel assembly of claim 17, wherein said axle and bearing are constructed of an HDPE having a 12 melt index and said wheel is constructed of an HDPE having a fractional melt index.

* * * * *